(12) United States Patent
Wells

(10) Patent No.: US 8,000,952 B2
(45) Date of Patent: Aug. 16, 2011

(54) METHOD AND SYSTEM FOR GENERATING MULTIPLE PATH APPLICATION SIMULATIONS

(75) Inventor: Bradley K. Wells, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 11/276,673

(22) Filed: Mar. 9, 2006

(65) Prior Publication Data

US 2007/0226706 A1 Sep. 27, 2007

(51) Int. Cl.
*G06F 9/44* (2006.01)
*G06F 9/45* (2006.01)

(52) U.S. Cl. .......... 703/22; 717/135; 717/124; 717/127; 717/128; 717/130; 714/45

(58) Field of Classification Search .................... 703/22; 717/135; 714/45
See application file for complete search history.

(56) References Cited

U.S. PATENT DOCUMENTS

| | | | |
|---|---|---|---|
| 5,062,148 A | 10/1991 | Edwards | |
| 5,136,698 A * | 8/1992 | Okamoto | 717/126 |
| 5,349,539 A | 9/1994 | Moriyasu | |
| 5,428,618 A * | 6/1995 | Ueki et al. | 717/124 |
| 5,506,549 A | 4/1996 | Crutcher | |
| 5,513,316 A * | 4/1996 | Rodrigues et al. | 714/38 |
| 5,660,547 A * | 8/1997 | Copperman | 434/29 |
| 5,729,676 A * | 3/1998 | Inoue | 714/38 |
| 5,787,285 A * | 7/1998 | Lanning | 717/130 |
| 6,327,559 B1 * | 12/2001 | Wile | 703/22 |
| 6,330,692 B1 * | 12/2001 | Kamuro et al. | 714/38 |
| 6,336,149 B1 * | 1/2002 | Preston | 710/1 |
| 6,434,728 B1 | 8/2002 | Arayama et al. | |
| 6,546,506 B1 * | 4/2003 | Lewis | 714/38 |
| 6,772,107 B1 * | 8/2004 | La Cascia et al. | 703/21 |
| 6,832,184 B1 | 12/2004 | Bleier, Jr. et al. | |
| 6,978,440 B1 * | 12/2005 | Pavela | 717/125 |
| 7,055,067 B2 * | 5/2006 | DiJoseph | 714/38 |
| 7,266,448 B2 * | 9/2007 | Park et al. | 701/209 |
| 7,313,564 B2 * | 12/2007 | Melamed et al. | 707/101 |
| 7,337,432 B2 * | 2/2008 | Dathathraya et al. | 717/125 |
| 7,340,650 B2 * | 3/2008 | Westmacott | 714/38 |
| 7,346,706 B2 * | 3/2008 | Rezaaifar et al. | 709/239 |
| 7,428,486 B1 * | 9/2008 | Casati et al. | 703/22 |
| 2002/0120396 A1 * | 8/2002 | Boies et al. | 701/209 |
| 2003/0005413 A1 * | 1/2003 | Beer et al. | 717/125 |
| 2003/0088593 A1 * | 5/2003 | Stickler | 707/205 |

(Continued)

FOREIGN PATENT DOCUMENTS

JP 6061952 A 3/1994

(Continued)

*Primary Examiner* — Kamini S Shah
*Assistant Examiner* — Akash Saxena
(74) *Attorney, Agent, or Firm* — Anna L. Linne; Roberts Mlotkowski Safran & Cole, P.C.

(57) ABSTRACT

A system and method to generate simulations of a target application or software. The method comprises recognizing a start point associated with a multiple path simulation of a target application and automatically generating simulation branches of the multiple path simulation from the recognized start point. The method and system of the invention allows a simulation developer to create "multi-path" simulations more quickly and efficiently by, for example, (i) recognizing which junctions in the simulation are starting points for multiple paths, (ii) where the multiple paths converge, and (iii) the content of the multiple paths.

24 Claims, 4 Drawing Sheets

U.S. PATENT DOCUMENTS

| | | | |
|---|---|---|---|
| 2003/0196190 A1* | 10/2003 | Ruffolo et al. | 717/124 |
| 2003/0229825 A1* | 12/2003 | Barry et al. | 714/38 |
| 2004/0046792 A1* | 3/2004 | Coste et al. | 345/763 |
| 2004/0167758 A1 | 8/2004 | Takiishi et al. | |
| 2006/0241854 A1* | 10/2006 | Tu et al. | 701/202 |
| 2007/0220341 A1* | 9/2007 | Apostoloiu et al. | 714/33 |
| 2007/0240118 A1* | 10/2007 | Keren | 717/124 |
| 2008/0155511 A1* | 6/2008 | Cohen | 717/131 |
| 2008/0244325 A1* | 10/2008 | Tyulenev | 714/38 |
| 2009/0055154 A1* | 2/2009 | Holland et al. | 703/22 |
| 2010/0251031 A1* | 9/2010 | Nieh et al. | 714/45 |

FOREIGN PATENT DOCUMENTS

| | | |
|---|---|---|
| JP | 2004254250 A | 9/2004 |

* cited by examiner

METHOD AND SYSTEM FOR GENERATING MULTIPLE PATH APPLICATION SIMULATIONS

FIELD OF THE INVENTION

The invention generally relates to providing a method and system for generating application simulations and, more particularly, to a method and system for generating multiple path application simulations.

BACKGROUND OF INVENTION

Simulations of software applications are typically created by running special programs referred to as simulation generation software. The simulation generation software is designed to monitor a simulation developer's interaction with another application, e.g., target software, and the changes that result from those interactions. For example, the simulation generation software records a stream of images and events, similar to a movie, of the interactions between the target software and the developer. These interactions can then be replayed to simulate the target software in order to teach a user specific features of the target software.

Like a movie, the initial simulation is a single path of execution, in which the flow of events follows one possible path through the target software. By way of illustration, a developer may wish to simulate a copy and paste operation for a word processing application. In this example, the developer may perform the following operation, in a single path flow:

(i) Highlight a specific word or words;
(ii) Click on "Edit" and scroll to and highlight "Copy";
(iii) Move the cursor to a desired location; and
(iv) Click on "Edit" and scroll to and highlight "Paste".

During these operations, the simulation generation software will record these actions in a single path, for future playback. Once recorded, the information will be presented to a student, as a simulation, in a single simulation path. In this manner, the student can perform the simulated operations, along with the simulation generation software.

A more sophisticated type of simulation is one with multi-path execution. In this more sophisticated simulation the users of the simulation are allowed to take more than one path of execution through the simulation. Typically, this is referred to as multi-path simulations, which contain options at specific junctions in the simulation that permit branching to a different section of the simulation thereby mimicking a different path in the target software.

By way of example, using the same copy and paste illustration, it is known that there are several different ways in which to accomplish this operation. For example, in addition to the above, the developer may wish to teach the following operation:

(i) Highlight a specific word or words;
(ii) Depress the "Ctrl" and "C" buttons on the keyboard;
(iii) Move the cursor to a desired location; and
(iv) Depress the "Ctrl" and "P" buttons on the keyboard.

However, to generate the multi-path simulation, two or more single path simulations must be manually combined. That is, in the illustrated example, the two simulations must be combined with a branching occurring between the (i) and (ii) operations. Branching to the different sections of the simulation must be manually added to the simulation stream, which is time consuming and tedious. This includes, for example, editing and/or erasing operations, which were recorded when returning back to a beginning point of the two simulations.

Accordingly, there exists a need in the art to overcome the deficiencies and limitations described hereinabove.

SUMMARY OF THE INVENTION

In an aspect of the invention, a method comprises recognizing a start point associated with a multiple path simulation of a target application and automatically generating simulation branches of the multiple path simulation from the recognized start point.

In another aspect of the invention, the method comprises providing one or more starting junctions in a simulation having multiple paths, recording different simulation branches of the multiple paths from a respective one of the one or more starting junctions and suspending recording when backing through operations of a target application.

In another aspect of the invention, a system comprising a hardware and/or software component for providing a starting point of multiple paths in a simulation of a target application, recording different simulation branches from the starting point, and suspending recording while returning to the starting point and prior to recording another of the different simulation branches in a forward operation.

In yet another aspect of the invention, a computer program product comprises a computer usable medium having readable program code embodied in the medium. The computer program product includes at least one component to: provide one or more starting junctions in a simulation having multiple paths, record different simulation branches of the multiple paths from a respective one of the one or more starting junctions and suspend recording when backing through operations of a target application.

In another aspect of the invention, the method is for deploying an application for simulating multiple operations associated with target software. The method comprises providing one or more starting junctions in a simulation having multiple paths and recording different simulation branches of the multiple paths from a respective of the one or more starting junctions. The method suspends recording when backing through operations of a target application. The suspending of the recording occurs prior to recording another of the different simulation branches and the backing through operations returns to the one or more starting junctions.

DETAILED DESCRIPTION OF EMBODIMENTS OF THE INVENTION

The invention is directed to a method and system for generating application simulations and, more particularly, to a method and system for generating multiple path application simulations. The method and system is platform independent and thus can be implemented within any database, on a single workstation or provided over a distributed network such as, for example, the Internet and more specifically on the World Wide Web. The method and system of the invention, in one embodiment, allows a simulation developer to create "multi-path" simulations more quickly and efficiently by, for example, (i) recognizing which junctions in the simulation are starting points for multiple paths, (ii) where the multiple paths converge, and (iii) the content of the multiple paths. In embodiments, the multi-path information is generated at the simulation creation time rather than at edit time. Playback can be run in Java (Java and all Java-based trademarks are trademarks of Sun Microsystems, Inc. in the United States, other countries, or both), Flash, Flat HTML or JavaScript, to name a few.

Figure 1:
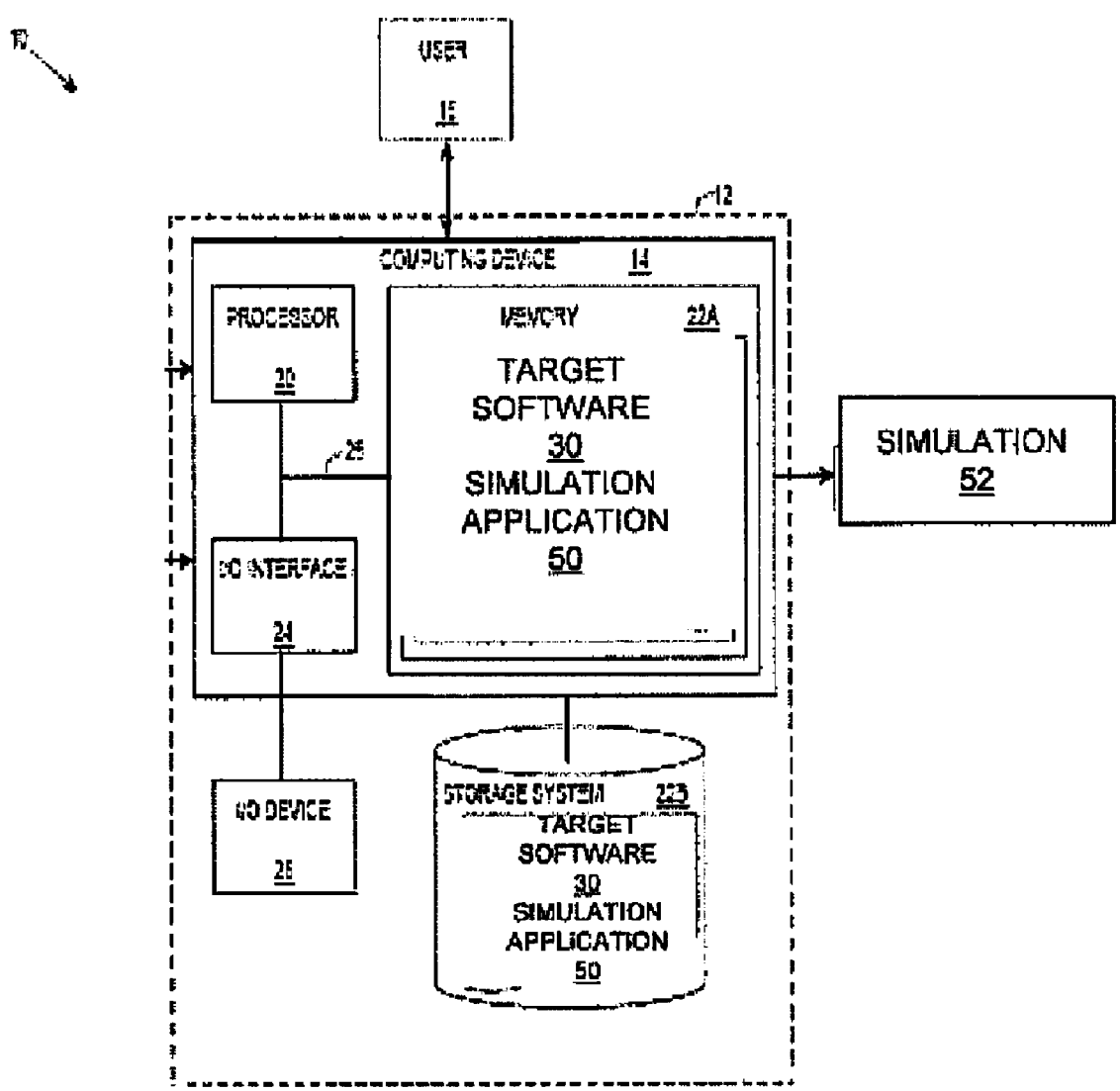
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 operable to generate and/or perform the multi-path simulation program 50 of the invention, e.g., process described herein.

The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data, such as from a target software 30 and the simulation application 50 of the invention, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, a developer 16 (e.g., user) can input information to the computer infrastructure 12 in order to generate a simulation 52. More specifically, the user can perform multiple operations on the target software, which is then recorded by the simulation application 50 of the invention. In this manner, the simulation application 50 can generate a multiple path simulation of the actions performed on the target software. In embodiments of the invention, the method and system of the invention may be provided by a service provider for a fee such as, a one-time fee, a subscription basis, etc.

In embodiments, by implementing the multi-path simulation of the invention, multiple operations of a target application and/or software may be recorded to provide a multi-path simulation 52, without the need to manually edit the recording. To accomplish such recordings, in embodiments, the method and system of the invention provides controls to define segments of, for example, starting, stopping and branching points in the multi-path simulation recording. These controls may be, for example, "Start," "Pause" and "End" commands, and combinations thereof, to achieve the functionality of the invention, as described herein. These controls can be implemented as definable key sequences or strokes or user interfaces that can be redefined to ensure that they do not interfere with the target software.

In embodiments, the methods and systems of the invention are structured and/or configured to implement the following controls which, in embodiments, can be processed by the infrastructure shown in FIG. 1. These controls, by way of non-limiting illustration, may include:

Start: The "Start" control signifies a current location within the simulation. This location can be a start point for multiple paths. This current location is "remembered" by the method and system of the invention such that simulation branches are automatically generated from this location.

Pause: The "Pause" control signifies an end of a path has been reached in the multi-path simulation. At this stage, in embodiments, the methods and systems of the invention suspend its recording while the user prepares the target software for the recording of a next path.

Resume: The resume control, which may be effectuated by, for example, a "Start" command following a "Pause" command, denotes that an additional path from the "remembered" starting point is being recorded or captured.

End: The "End" control signifies that the recording of the multiple paths is complete. At this stage, the branching within the simulation is completed and the recording of the simulation continues as a single path.

It should be recognized by those of skill in the art that the above nomenclature is not a limiting feature to the present invention, and that different controls and/or nomenclatures are contemplated by the present invention.

Thus, by way of one illustrative example, by implementing the invention a developer can explicitly designate a start and end point of branches in a multiple path simulation. This allows the developer to create a multi-path simulation without requiring any manual editing of the recording. Thus, by implementing the method and system of the invention, the simulation will not record information while the developer is backing through the target application or software to a starting point, prior to recording a different simulation branch. This eliminates the need for the developer to manually edit (e.g., erase) the information which would have otherwise been recorded or captured when the developer is backing up to the branching point.

Figure 2:
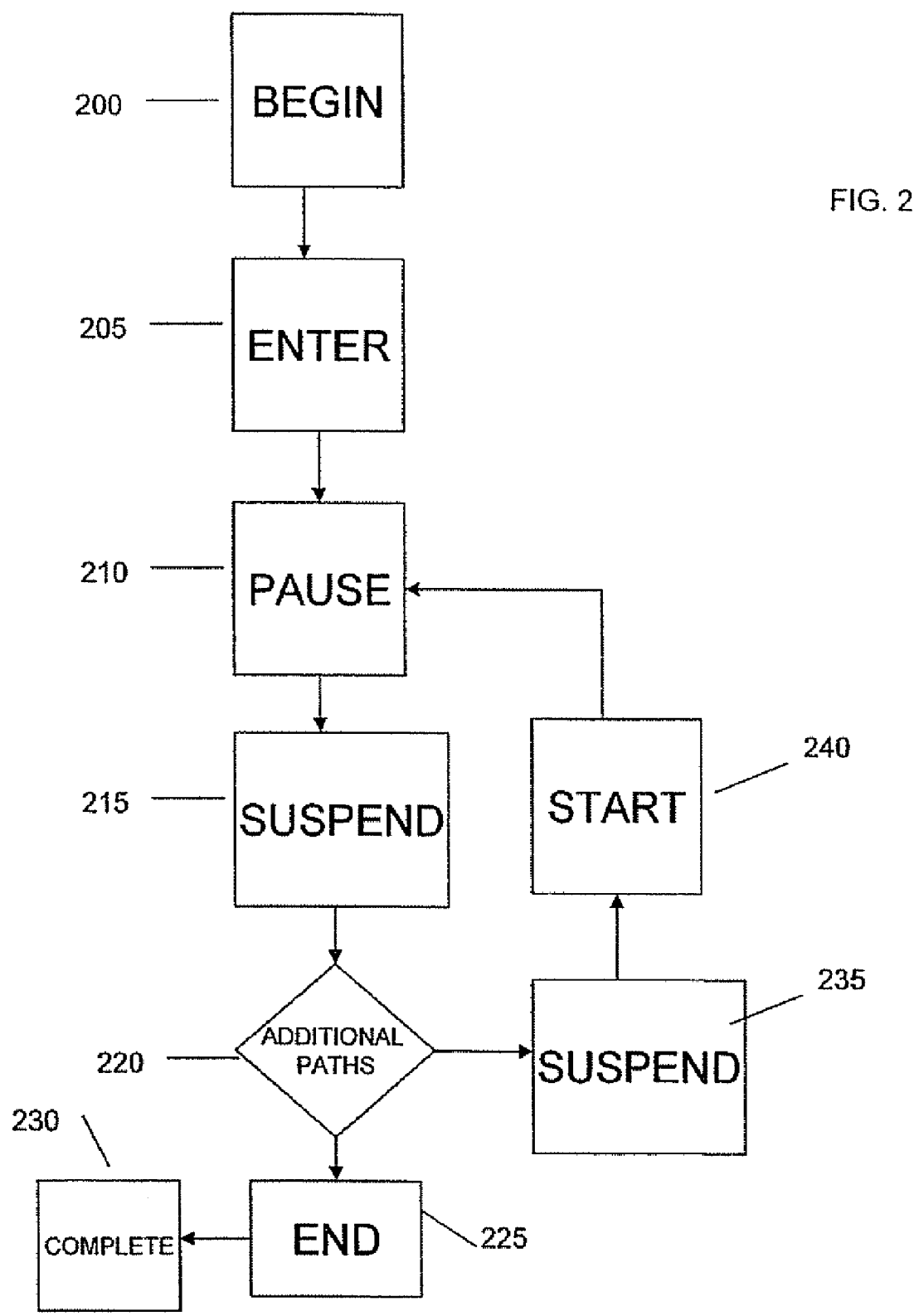
FIG. 2 is a flow chart showing steps implementing an embodiment of the invention.

FIG. 2 is a flow diagram of an embodiment of the invention. FIG. 2 may also be representative of a high-level block diagram, implementing the steps of the invention. The steps of FIG. 2 may be implemented on computer program code in combination with the appropriate hardware such as, for example, implemented and executed from either a server, in a client server relationship, or run on a user workstation with operative information conveyed to the user workstation.

Additionally, the invention can take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In another embodiment, the invention provides a business method that performs the process steps of the invention on a subscription, advertising, and/or fee basis. That is, a service provider, such as a Solution Integrator, could offer to provide simulation tools to a user. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Referring back to FIG. 2, at step 200, a developer begins the simulation process by entering a start command, which signifies a current start point location within the simulation. The current location is "remembered" such that simulation branches are automatically generated from this location. At step 205, the developer can enter different operations for a particular task, e.g., copy and paste, which are recorded for the simulation. At step 210, after the operation(s) is complete or at some other point during the operation, the developer enters the pause command, which signifies an end of the path has been reached. At step 215, the method and system of the invention suspends its recording.

At step 220, a determination is made as to whether there are additional paths required for a particular operation. If there are no additional paths which need recording, the developer will end the simulation path, at step 225. This may be accomplished by entering an "End" command. At step 230, the branching within the simulation is completed and the recording of the simulation continues as a single path, if necessary.

If there are additional branches for recording, in embodiments, the method and system of the invention suspends its recording while the user prepares the target software for the recording of a next path, at step 235. This preparation may include backing through the target software through previously recorded operations to the staring point, or alternatively, returning back to the starting through another path. At this stage, the simulation will revert back to the "remembered" location, at which time, the developer, at step 240, enters a start command, e.g., stop and pause, which denotes that an additional path from the "remembered" screen is being recorded. The system then reverts to step 210, in embodiments.

EXAMPLE OF USE

The following is an illustrative example implementing the methods and systems of the invention. The example provided herein is not to be considered limiting, and is provided for illustrative purposes to better understand the invention. Thus, additional examples, modes of operation, etc. are contemplated by the invention, as discussed throughout the description. In the example described, three different paths are outlined for opening a dialog in the target software. The three paths that are simulated include, Option 1. Clicking on "File" and then clicking on "Open";
Option 2. Pressing Alt+F, then pressing "O"; and
Option 3. Pressing Alt+F, using arrow keys to move down, and then pressing Enter.

Figure 3A:
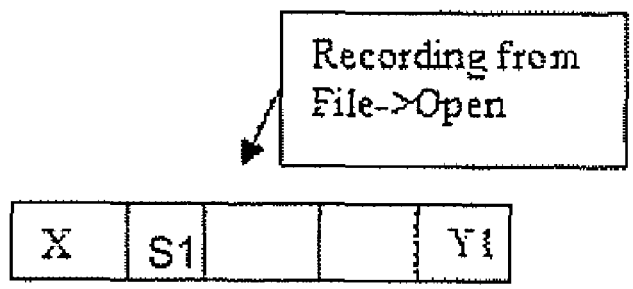
FIGS. 3A-3D are graphical representations of exemplary illustrations implementing aspects of the invention.

In this example, the simulation developer starts the target software and methods and systems of the invention, e.g., simulation generation apparatus. The simulation developer issues the "Start" command and, as shown in representative FIG. 3A, the simulation generation apparatus remembers a starting point in the multi-path simulation, represented by "S1". The simulation developer then performs the desired operations to effectuate option 1, e.g., clicks on "File" and then "Open". These operations generate a short simulation segment as represented by the empty boxes in FIG. 3A. The simulation developer then issues the "Pause" command and, as represented in FIG. 3A, the simulation generation software remembers the end of the first path, represented as "Y1".

Figure 3B:
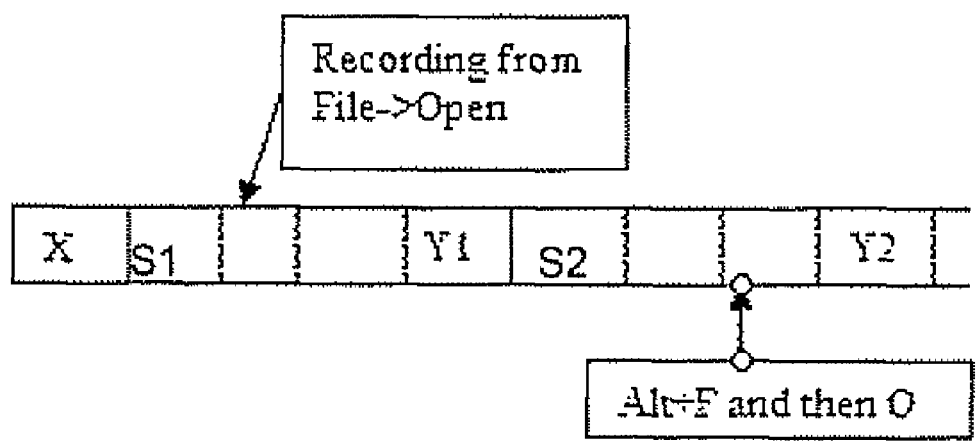

The simulation developer closes the Open dialog box to take the target software back to the starting state, "X". In a more complex example, this might entail backing out of a complicated transaction or even restarting the target application. The simulation developer then issues the "Start" command to restart the recording process, as represented by "S2" of FIG. 3B. The simulation developer performs the desired operations to effectuate the second path, option 2, which is Alt+F and the pressing "O". These operations generate a short simulation segment as represented by the empty boxes following "S2", in FIG. 3B. The simulation developer issues the "Pause" command at which stage the generation software remembers the end point of the second path, as represented by "Y2".

Figure 3C:
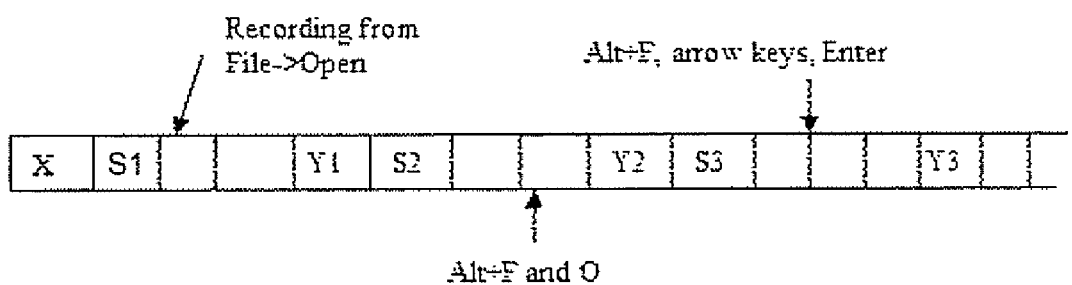

Referring to FIG. 3C, the simulation developer closes the Open dialog box to take the target software back to the starting state, "X". In an alternative embodiment, the starting point may be the starting state represented by another beginning path such as, for example, S1 or S2, or alternatively, within the operation, itself, if there are common steps to be taken.

The simulation developer issues the "Start" command to restart the recording process, as represented by "S3". The simulation developer proceeds with the third path, option 3, which is Alt+F, Down Arrow, Down Arrow and Enter, as represented by the empty boxes following "S3". The simulation developer issues the "End" command which tells the simulation generation software to a) remember the location of the third path and to b) create the branches within the simulation to permit the multiple paths to be taken. The end point of the third path is represented by "Y3" of FIG. 3C.

Thus, as should be understood, as shown in the graphical representation of FIG. 3C, the start and end points for option 1 is "S1" and "Y1" respectively. The start and end points for option 2 is "S2" and "Y2", respectively, and the start and end points for option 3 is "S3" and "Y3", respectively.

Figure 3D:
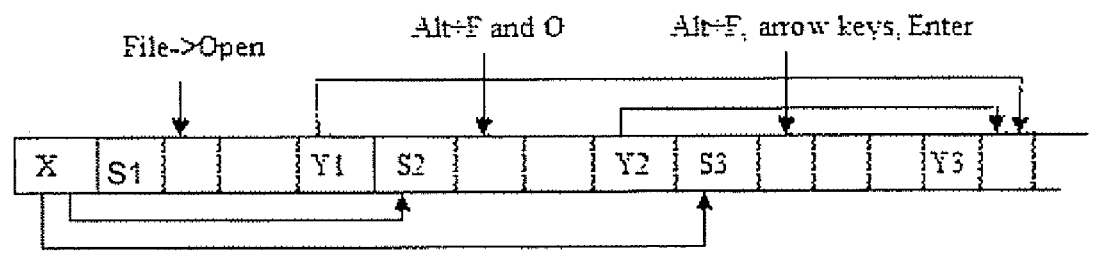

As shown graphically in FIG. 3D, the three options converge at the starting point "X", with "S1", "S2" and "S3", being the starting points for each branch. In operation, after a particular branch is simulated for the user, e.g., option 1, the simulation will automatically converge on the location just after the end point of the branching. In the above example, the simulation will automatically converge on the location just after the end point, "Y3", of option 3.

Additionally, as represented graphically in FIG. 3D, the user can begin any simulation option, without the need to view a previous simulation option. For example, the user can directly proceed to option 2, at starting point "S2", by bypassing over option 1, and more particularly, starting point "S1". Thus, in this manner, since the methods and systems of the invention have recorded all options, and memorized or remembered the starting and ending points for each branch, it is possible to easily branch to any option, desired by the user.

By using the methods and systems of the invention, the developer no longer has to edit the simulation when generating multiple path simulations. Instead, the methods and system of the invention automatically generate the multi-path simulation. Thus, in implementation, when the developer takes the target software back to a starting point to begin another path, there is no need to edit, e.g., erase, the operations which are needed to take the target software back to the starting point.

While the invention has been described in terms of embodiments, those skilled in the art will recognize that the invention can be practiced with modifications and in the spirit and scope of the appended claims.

What is claimed is:

1. A method comprising:
   providing controls to automatically generate a plurality of simulation paths for a multiple path simulation of a target application, the controls being operable to:
   provide a start point for the plurality of simulation paths and cause the start point to be stored so that the plurality of simulation paths are generated from the start point;
   provide a current location within the multiple path simulation as an end of a current simulation path and cause suspension of a recording of the current simulation path;
   start a recording of at least one remaining simulation path from the start point while the recording of the current simulation path is suspended; and
   provide an end location within the multiple path simulation as an end point for the plurality of simulation paths and a recording of the multiple path simulation can either end or continue as a recording of a single common path;
   recognizing the start point associated with the plurality of simulation paths using a processor;
   generating automatically the plurality of simulation paths for the multiple path simulation from the start point using the processor; and
   recording a simulation path of the multiple path simulation, ending the simulation path, suspending the recording of the multiple path simulation, backing through previously recorded operations of the target application to the start point while recording of the multiple path simulation is suspended, and resuming recording of the multiple path simulation at the start point in the target application to obtain a recording of at least one remaining simulation path of the multiple path simulation.

2. The method of claim 1, further comprising recording a forward operation associated with each simulation branch of the multiple path simulation.

3. The method of claim 1, wherein the controls are provided by a service provider.

4. The method of claim 3, wherein the controls are provided for a fee.

5. The method of claim 1, further comprising recording of the multiple path simulation as a single path.

6. The method of claim 1, wherein the steps of claim 1 are platform independent.

7. The method of claim 1, wherein the steps of claim 1 are implemented at least one of within a database, on a single workstation and over a network.

8. The method of claim 1, wherein the start point is prior to a beginning point of an operation for the target application.

9. The method of claim 1, wherein the recording of the multipath simulation comprises recording images of interactions with the target application.

10. The method of claim 9, further comprising:
    automatically determining a convergence point where the simulation converges after the end of each simulation path.

11. The method of claim 1, wherein the backing through the previously recorded operations of the target application includes closing out of an operation that was previously executed in a previous simulation path or restarting the target application.

12. The method of claim 1, wherein providing of the start point and the end point for the plurality of simulation paths allows for the processor to generate the plurality of simulation paths for the multiple path simulation and allows for a user to create the multiple path simulation without having to manually combine the plurality of simulation paths with a branch occurring between operations and without having to manually edit information which would have been recorded while the user was backing through the multiple path simulation.

13. A method for deploying an application for simulating multiple operations associated with a target application, comprising:
    defining a start point for a simulation path of a plurality of simulation paths for a multiple path simulation so that remaining simulation paths of the plurality of simulation paths are generated from the start point;

defining an end point for the plurality of simulation paths so that recording of the plurality of simulation paths can either end or continue as a recording of a single common simulation path;

recording images of the multiple path simulation during a common simulation path; and recording images of the simulation path of the plurality of simulation paths, ending the simulation path, suspending the recording of images of the simulation path and the common simulation path, backing through previously recorded operations of the target application to the start point while recording of images of the simulation path and the common simulation path are suspended, and recording images of at least one remaining simulation path at the start point in the target application to obtain a recording of images of the at least one remaining path of the multiple path simulation, wherein defining the start point and the end point for the plurality of simulation paths allows for a processor to generate the plurality of simulation paths for the multiple path simulation and allows for a user to create the multiple path simulation without requiring any manual editing of the recording of images of the multiple path simulation.

14. The method of claim 13, wherein the steps of claim 13 are platform independent and implemented at least one of within a database, on a single workstation or provided over a distributed network.

15. The method of claim 13, further comprising preparing the target application for the recording by returning back to a start point through an alternative path from previously recorded simulation branches.

16. The method of claim 13, further comprising recognizing a convergence point of the multiple paths and a content of the multiple paths.

17. The method of claim 16, further comprising determining where additional paths of the multiple paths are required for a particular operation.

18. A system comprising:
a CPU, a computer readable memory and a computer readable storage media;
first program instructions to provide controls to automatically generate a plurality of simulation paths for a multiple path simulation of a target application, the controls operable to:
provide a start point for the plurality of simulation paths and cause the start point to be stored so that the plurality of simulation paths are generated from the start point;
provide a current location within the multiple path simulation as an end of a current simulation path and cause suspension of a recording of the current simulation path:
start a recording of at least one remaining simulation path from the start point while the recording of the current simulation path is suspended; and
provide an end location within the multiple path simulation as an end point for the plurality of simulation paths and a recording of the multiple path simulation can either end or continue as a recording of a single common path;
second program instructions to recognize the start point associated with the plurality of simulation paths using a processor;
third program instructions to automatically generate the plurality of simulation paths for the multiple path simulation from the start point using the processor; and
fourth program instructions to record a simulation path of the multiple path simulation, ending the simulation path, suspending the recording of the multiple path simulation, backing through previously recorded operations of the target application to the start point while recording of the multiple path simulation is suspended, and resuming recording of the multiple path simulation at the start point in the target application to obtain a recording of at least one remaining path of the multiple path simulation, wherein providing of the start point and the end point for the plurality of simulation paths allows for the processor to generate the plurality of simulation paths for the multiple path simulation and allows for a user to create the multiple path simulation without requiring any manual editing of the recording of the multiple path simulation; and wherein the first, second, third and fourth program instructions are stored on the computer readable storage media for execution by the CPU via the computer readable memory.

19. The system of claim 18, wherein the CPU, the computer readable memory and the computer readable storage media resides on a server provided by a service provider.

20. The system of claim 18, further comprising fifth program instructions for recording a forward operation associated with each simulation branch of the multiple path simulation.

21. The system of claim 18, further comprising a hardware component to record the simulation as a single path.

22. The system of claim 18, wherein the CPU, the computer readable memory and the computer readable storage media are platform independent.

23. A computer program product comprising a computer usable storage medium having readable program code embodied in the medium, the computer program product includes at least one component to:
provide controls to automatically generate a plurality of simulation paths for a multiple path simulation of a target application, the controls comprising:
a start control which communicates to a processor a start point for a simulation path of the plurality of simulation paths and causes the start point to be stored so that remaining simulation paths of the plurality of simulation paths are generated from the start point;
a pause control which communicates to the processor to provide a current location within the multiple path simulation as an end of a current simulation path and causes suspension of a recording of the current simulation path;
a resume control which causes the processor to start a recording of at least one remaining simulation path from the start point while the recording of the current simulation path is suspended; and
an end control which communicates to the processor that an end location within the multiple path simulation is an end point for the plurality of simulation paths and recording of the multiple path simulation can either end or continue as a recording of a single common path;
execute recording of the plurality of simulation paths for the multiple path simulation from the start point of the multiple path simulation of the target application; and
end a simulation path, suspend recording of the multiple path simulation while backing through previously recorded operations of the target application to the start point, and continue recording of the multipath simulation at the start point, wherein providing of the start point and the end point for the plurality of simulation paths allows for the processor to generate the plurality of simulation paths for the multiple path simulation and allows for a user to create the multiple path simulation without requiring any manual editing of the recording of the multiple path simulation.

24. A method comprising:

providing controls to automatically generate a plurality of simulation paths for a multiple path simulation of a target application, the controls comprising:

a start control which communicates to a processor a start point for a simulation path of the plurality of simulation paths and causes the start point to be stored so that remaining simulation paths of the plurality of simulation paths are generated from the start point;

a pause control which communicates to the processor to provide a current location within the multiple path simulation as an end of a current simulation path and causes suspension of a recording of the current simulation path;

a resume control which causes the processor to start a recording of at least one remaining simulation path from the start point while the recording of the current simulation path is suspended; and an end control which communicates to the processor that an end location within the multiple path simulation is an end point for the plurality of simulation paths and recording of the multiple path simulation can either end or continue as a recording of a single common path;

the processor executing recording of the plurality of simulation paths for the multiple path simulation from the start point; and the processor ending a simulation path, suspending recording of the multiple path simulation while backing through previously recorded operations of the target application to the start point, and continuing recording of the multipath simulation at the start point in the target application to obtain a recording of at least one remaining simulation path of the multiple path simulation, wherein providing the start point and the end point for the plurality of simulation paths allows for the processor to generate the plurality of simulation paths for the multiple path simulation and allows for a user to create the multiple path simulation without requiring any manual editing of the recording of the multiple path simulation.

\* \* \* \* \*